United States Patent [19]
Suzuki et al.

[11] 3,945,458
[45] Mar. 23, 1976

[54] INTERLOCKING DEVICE FOR MANUAL CHANGE SPEED GEAR

[75] Inventors: Kunihiko Suzuki, Yokohama; Katsuyasu Kurisu, Kawasaki, both of Japan

[73] Assignee: Nissan Motor Company Limited, Yokohama, Japan

[22] Filed: Oct. 4, 1974

[21] Appl. No.: 512,229

[30] Foreign Application Priority Data
Nov. 5, 1973   Japan............................ 48-127133

[52] U.S. Cl................................. 180/82 C; 74/477
[51] Int. Cl.²........................................ B60K 28/00
[58] Field of Search...... 180/82 A, 82 R, 82 C, 103, 180/77 R, 70 R; 340/52 E, 52 F, 278; 307/10 SB; 280/150 SB; 74/475, 477

[56] References Cited
UNITED STATES PATENTS

| | | | |
|---|---|---|---|
| 2,637,221 | 5/1953 | Backus et al. | 74/477 X |
| 2,654,268 | 10/1953 | Perkins | 74/477 X |
| 2,847,871 | 8/1958 | Schick | 74/477 |
| 3,438,455 | 4/1969 | Redmond | 180/82 C |
| 3,718,902 | 2/1973 | Pearsall | 180/82 C |
| 3,780,602 | 12/1973 | Thornley | 74/477 X |

FOREIGN PATENTS OR APPLICATIONS

| | | | |
|---|---|---|---|
| 944,045 | 12/1963 | United Kingdom | 280/150 SB |

*Primary Examiner*—Robert R. Song
*Assistant Examiner*—R. Schrecengost

[57] ABSTRACT

A plurality of spaced apart parallel shift rods for changing gears have interlocking plungers arranged between adjacent shift rods and separating pieces positioned between adjacent interlocking plungers in alignment thereof and contained in transverse bores of the shift rods. An actuator acts on the plungers to normally lock the shift rods. The actuator is disabled when the driver performs a prescribed safety operation, for example, wears his safety seat belt.

8 Claims, 3 Drawing Figures

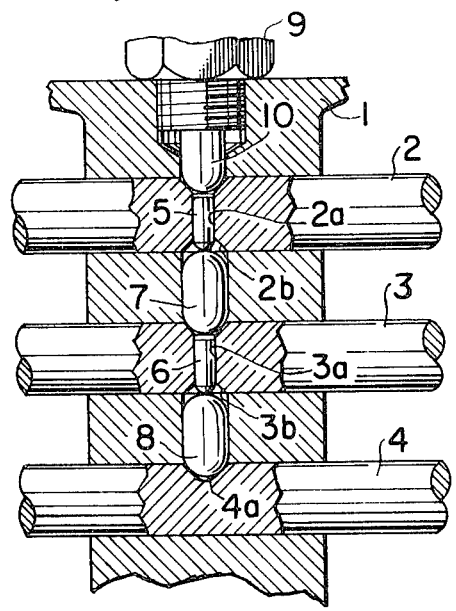
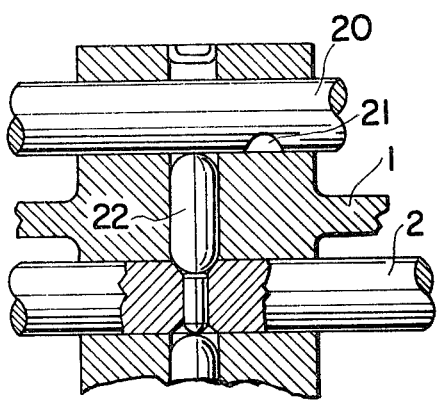
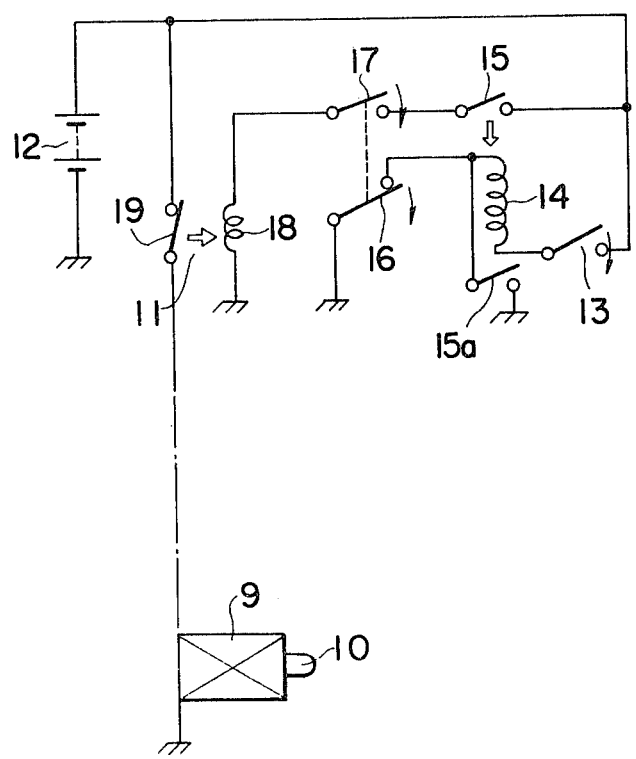

INTERLOCKING DEVICE FOR MANUAL CHANGE SPEED GEAR

This invention relates generally to a manual change speed gear of a motor car, and more particularly to an interlocking device for the change speed gear.

In recent years, seat belts are used extensively in motor cars for protecting the drivers thereof. However, some drivers do not wear the seat belts for the reason of nuisance thus suffering injuries in case of accidents.

Since the effectiveness of the seat belt has been proven by various experiments and actual accidents, certain proposals have been made to force the driver to wear his seat belt. Accordingly, it is desirable to enable the driver to operate the car only when he wears his seat belt.

Accordingly, it is an object of this invention to provide an improved interlocking device for a manual change speed gear of a motor car that enables the driver to operate the car only when he wears his safety seat belt.

Another object of this invention is to provide an improved interlocking device that can positively prevent simultaneous operation of a plurality of ratios of a change speed gear.

Still another object of this invention is to provide an improved interlocking device of the type referred to above that can be readily applied to existing change speed gears.

A further object of this invention is to provide an improved electric circuit for operating the interlocking device.

According to this invention there is provided an interlocking device for a manual change speed gear of a motor car of the type having a plurality of spaced apart parallel shift rods for changing gears, interlocking plungers arranged between adjacent shift rods, separating pieces positioned between adjacent interlocking plungers in axial alignment therewith, the separating pieces being contained in transverse bores of respective shift rods, characterized in that there are provided an actuator for causing the plungers to normally lock the shift rods and means for disabling the actuator only when the driver of the motor car performs a prescribed safety operation.

Perusal of the following description of the invention will make the invention clear to the reader when he or she reads the accompanying drawings, in which:

FIG. 1 is a section view of a preferred embodiment of the novel interlocking device of this invention;

FIG. 2 is a section view of a modified embodiment of this invention; and

FIG. 3 shows an electric circuit for operating the actuator shown in FIG. 1.

FIG. 1 shows the shift rods of a manual change speed gear no numeral and an interlocking mechanism, as shown, a plurality of shift rods 2, 3 and 4 are provided extending through a casing 1 of a change speed gear. The shift rods 2 and 3 are respectively provided with transverse bores 2a and 3a at their centers and separating pieces 5 and 6 are inserted in the transverse bores of respective shift rods 2 and 3 to transmit the force excerted by an actuator 9 onto interlocking plungers 7 and 8 in series. These plungers have rounded ends to fit in rounded openings 2b, 3b and 4b on ends of the bores. When one of the shift rods is operated to establish a particular gear ratio, the interlocking plungers corresponding to the operated shift rod are pushed out of the bores thereof to enter the rounded openings of adjacent shift rods thus locking then for preventing simultaneous gear ratio selection of two or more sets in the change speed gear.

The construction thus far described is the same as that of a conventional interlocking device. According to this invention, the actuator 9 is provided in the casing 1 in alignment with respective separating pieces 5, 6 and interlocking plungers 7, 8 so that its operating member 10 exercises force on respective interlocking plungers 7 and 8 via separating pieces 5 and 6. The actuator 9 may be operated by a solenoid or fluid pressure (not shown).

An operating circuit of the actuator 9 is shown in FIG. 3. The actuator 9 shown in FIG. 3 is a solenoid and its coil (no numeral) is normally energized by a source of electric power 12 via normally closed switch 19. As a result, respective interlocking plungers 7 and 8 are urged to engage rounded openings of respective shift rods 2, 3 and 4 thereby locking the same. There are also provided a seat switch 13 which is closed when the driver sits on his seat of the motor car and a seat belt switch 16 which is opened when the driver wears his seat belt. Accordingly, when the driver sits on his seat, seat switch 13 is closed to energize a coil 14 from source 12 via seat switch 13 and the seat belt switch 16. When energized, coil 14 closes a switch 15 and a self-holding switch 15a which closes a self-holding circuit for coil 14. When the driver wears his seat belt, switch 16 is opened and a switch 17 interlocked therewith is closed thereby energizing a coil 18 for opening the normally closed switch 19 as shown by the arrow 16 via switches 15 and 17 which are now closed. Consequently, actuator 9 is de-energized to unlock shift rods 2, 3 and 4. In this manner, the actuator 9 is maintained in its operated position to lock respective shift rods until the driver sits on his seat and wears his seat belt. Thus, the driver can not run the motor car unless he wears the seat belt thus assuring his safety at the time of collision or other accident.

When fluid pressure is utilized to actuate the actuator 9, coil 18 is used to operate a suitable fluid valve for admitting and discharging hydraulic fluid under pressure to and from the actuator.

In a modified embodiment shown in FIG. 2 an operating rod 20 having a notch 21 is disposed parallelly with the uppermost shift rod 2 as seen in FIG. 2. The operating rod 20 coacts reciprocated with an actuator, not shown, but identical to that shown in FIG. 1. Thus, when the notch 21 is brought into alignment with a plunger 22 it fits into the notch 21 when the shift rod 2 is operated. According to this modification the actuator does not protrude beyond the casing 1' so that this modification is suitable for installation in a limited space.

The invention has the following advantages in addition to those described above.

1. It can be applied to an existing change speed gear with a slight change, that is, it is possible to apply the novel interlocking device to existing means for preventing simultaneous use of two sets of speed changing gears by slightly modifying the same.

2. Only a small number of component parts is required to be added to interlock the device with the seat belt operation.

3. The same interlocking device can be used for all types of manual change speed gears including floor shift type, remotely controlled type and multi-stage type (for example, 3, 4 or 5 forward ratios).

Although the invention has been described in connection with a seat belt it will be clear that the novel interlocking device of this invention can also be combined with means for locking sefety operations, and means for preventing thereto.

What is claimed is:

1. An interlocking device for a manual change speed gear of a motor vehicle, comprising:
   a plurality of spaced apart parallel shift rods for changing gears;
   interlocking plungers between adjacent said shift rods;
   separating pieces positioned between adjacent said interlocking plungers in axial alignment therewith, said separating pieces being contained in transverse bores of respective shift rods; and
   an actuator causing said interlocking plungers to normally lock said shift rods, including a rod shaped member which is arranged adjacent one of said interlocking plungers in parallel with said shift rods and formed with a notch at a portion of an outer peripheral surface thereof, said rod shaped member having two relative positions thereof one of which is a first position wherein said shift rods are unlocked when said notch receives therein one of said interlocking plungers, the other of which is a second position wherein said shift rods are locked when said notch does not receive therein one of said interlocking plungers.

2. An interlocking device as claimed in claim 1, in which said actuator is electrically operated.

3. An interlocking device as claimed in claim 1, in which each of said interlocking plungers has rounded ends and each of said shift rods is provided with rounded openings at both ends of said transverse bores for receiving said round ends of said interlocking plunger.

4. An interlocking device as claimed in claim 1, further comprising means positioning said rod shaped member of said actuator into said first position only when a driver of the motor vehicle performs a prescribed safety operation.

5. An interlocking device as claimed in claim 4, in which said means is of a type which positions said rod shaped member into said second position when the vehicle driver wears a seat belt.

6. An interlocking device as claimed in claim 4, in which said actuator is operated by a signal generated in an electrical circuit comprising a normally closed switch for normally energizing said actuator, a seat switch disposed to be closed when the driver sits on his seat of the vehicle, and a seat belt switch arranged to be closed when the driver wears his seat belt for opening a normally closed switch.

7. An interlocking device as claimed in claim 6, in which said electrical circuit further comprising a relay connected to be energized when said seat switch is closed, said relay having a switch in series with said seat belt switch so that said actuator is disabled only when the driver sits on his seat and wears his seat belt.

8. In an interlocking device for a manual change speed gear of a motor vehicle, comprising a casing, a plurality of spaced parallel shift rods whose axes lie in substantially the same plane and which are selectively axially movable in the casing to provide a required gear ratio, a transverse passage in the casing, the axis of said passage being perpendicular to the axes of said shift rods, a recess on an outside one of said shift rods and facing an adjacent shift rod, a transverse bore in each of the other shift rods, said recess, said bores and said passage being substantially aligned when said shift rods are in a predetermined relative position, a separating piece slidable in each said transverse bores, said separating pieces being dimensioned so as to be able to lie wholly within the circumference of their respective shift rods, a plurality of interlocking plungers slidable in said transverse passage, one of said interlocking plungers being engageable with said recess, and rods; the improvement in which there is an actuator causing said interlocking plungers to normally lock said shift rods, said actuator comprises a rod shaped member slidably disposed in a passage provided in the casing adjacent one of said interlocking plungers so as to perpendicularly cross with said transverse passage and to lie in the same plane as said shift rods, said rod shaped member being formed with a notch at a portion of the outer peripheral surface thereof and having two positions one of which is a first position wherein said shift rods are unlocked when the notch receives therein one of the interlocking plungers and the other of which is a second position wherein said shift rods are locked when the notch does not receive therein one of said interlocking plungers, and means urging said rod shaped member to the first position only in response to electrical signals received from electrical means operable only after a driver of the motor vehicle has completed a prescribed safety operation.

* * * * *